US010233993B2

(12) United States Patent
Cleveland

(10) Patent No.: US 10,233,993 B2
(45) Date of Patent: Mar. 19, 2019

(54) METHOD AND APPARATUS FOR SIMULATING A NON-LINEAR FORCE

(71) Applicant: BAE Systems Information and Electronics Systems Integration Inc., Nashua, NH (US)

(72) Inventor: Kenneth D. Cleveland, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 212 days.

(21) Appl. No.: 15/032,156

(22) PCT Filed: Aug. 19, 2015

(86) PCT No.: PCT/US2015/045812
§ 371 (c)(1),
(2) Date: Apr. 26, 2016

(87) PCT Pub. No.: WO2016/028848
PCT Pub. Date: Feb. 25, 2016

(65) Prior Publication Data
US 2016/0258502 A1  Sep. 8, 2016

Related U.S. Application Data

(60) Provisional application No. 62/039,065, filed on Aug. 19, 2014.

(51) Int. Cl.
*G09B 23/32* (2006.01)
*F16F 3/04* (2006.01)
(Continued)

(52) U.S. Cl.
CPC .......... *F16F 3/04* (2013.01); *G09B 9/00* (2013.01); *G09B 23/10* (2013.01); *A47C 31/126* (2013.01);
(Continued)

(58) Field of Classification Search
CPC ...................................................... G09B 23/32
(Continued)

(56) References Cited

U.S. PATENT DOCUMENTS 5,263,695 A * 11/1993 Bianchi ................. B60G 11/32
267/225
6,347,518 B1 * 2/2002 Kingston ................ B60T 7/042
60/552

(Continued)

FOREIGN PATENT DOCUMENTS

WO  WO2007098622 A1  9/2007
WO  WO2013018934 A1  2/2013

OTHER PUBLICATIONS

PCT/US2015/045812, ISR mailed on Jan. 7, 2016.

*Primary Examiner* — Clayton E Laballe
*Assistant Examiner* — Kevin Butler
(74) *Attorney, Agent, or Firm* — Davis & Bujold, PLLC; Scott J. Asmus

(57) ABSTRACT

Non-linear forces are simulated by a dual-rate spring apparatus, which may also be used to impose nonlinear forces. The apparatus includes a carriage and at least two springs arranged sequentially in series with one another. The spring constant is changed by initially allowing both of the springs to compress to a point and, thereafter, after one spring is generally completely compressed, allowing only the other spring to compress further.

7 Claims, 6 Drawing Sheets

(51) Int. Cl.
  *G09B 23/10*   (2006.01)
  *G09B 9/00*    (2006.01)
  *G09B 23/30*       (2006.01)
  *G09B 23/28*       (2006.01)
  *G01M 17/00*       (2006.01)
  *A47C 31/12*       (2006.01)

(52) U.S. Cl.
  CPC ............ *G01M 17/00* (2013.01); *G09B 23/28* (2013.01); *G09B 23/30* (2013.01); *G09B 23/32* (2013.01)

(58) Field of Classification Search
  USPC ........................................................ 73/866.4
  See application file for complete search history.

(56) References Cited

U.S. PATENT DOCUMENTS

| | | | | |
|---|---|---|---|---|
| 7,350,774 B2 * | 4/2008 | Chun | ................... | F16F 1/041 |
| | | | | 267/169 |
| 2002/0038929 A1 * | 4/2002 | Now | ................... | B60G 15/065 |
| | | | | 267/217 |
| 2005/0016976 A1 * | 1/2005 | Belfiore | ................ | B23K 9/124 |
| | | | | 219/137.2 |
| 2008/0099968 A1 * | 5/2008 | Schroeder | ............. | B62K 25/08 |
| | | | | 267/166 |
| 2011/0291338 A1 * | 12/2011 | Pepka | ...................... | F16F 3/04 |
| | | | | 267/225 |
| 2011/0314976 A1 * | 12/2011 | Anjanappa | .......... | B25B 23/1427 |
| | | | | 81/480 |
| 2012/0286462 A1 * | 11/2012 | Pepka | ...................... | F16F 3/04 |
| | | | | 267/177 |
| 2016/0258502 A1 * | 9/2016 | Cleveland | ................ | G09B 9/00 |

\* cited by examiner

METHOD AND APPARATUS FOR SIMULATING A NON-LINEAR FORCE

This application claims benefit from provisional U.S. Patent Application Ser. No. 62/039,065 filed Aug. 19, 2014.

BACKGROUND OF THE INVENTION

The present invention relates to simulations. More particularly, it relates to the simulation of non-linear forces.

The prior art discloses a number of ways to simulate nonlinear forces.

One prior spring system for displacing elements in a nonlinear manner consists of two springs, a rod, and a housing unit. One spring surrounds the other and both are encased by the housing unit. The springs exert a nonlinear load versus deflection curve as the rod moves between the compressed and the extended positions.

U.S. Pat. No. 4,653,736 describes a spring system for providing an elastic force between two machine parts. This assembly consists of two concentric springs, a compression spring and a tension spring, in a housing unit. The springs are connected at one end by a movable coupling piece and at the other by a stationary stop. This assembly uses a movable stop to allow for variation of the effective point of connection between the compression spring and the machine part it is connected to.

Related improvements, however, are still necessary to simplify the mechanism, lighten the mechanism, and make the mechanism more compact.

SUMMARY OF THE INVENTION

Wherefore, it is an object of the present invention to overcome the above mentioned shortcomings and drawbacks associated with the prior art.

The present invention provides improved simulation of non-linear forces via a dual-rate spring system. The system includes an apparatus which may also be used to impose nonlinear force. This apparatus includes a carriage or a plunger and two springs arranged in series. A changing spring constant is achieved by initially allowing both of the springs to compress then allowing only one to compress.

The present invention also relates to a method of generating a non-linear spring force with an apparatus comprising a base, a carriage and a plurality of springs arranged in series, the method comprising steps of: allowing at least two of the plurality of springs to compress during a first portion of a stroke of the carriage; and then allowing only one of the plurality of springs to compress during a second portion of the stroke, thereby changing the effective spring constant.

The present invention also relates to an apparatus for generating a non-linear spring force, said apparatus comprising: a base, a carriage supported by the base so as to be linearly movable with respect to the base under application of an applied force, a spring arrangement for resisting the applied force, and the spring arrangement having a variable effective spring rate and comprising: a plurality of springs arranged in series, including a first spring disposed between first and second retainer elements, and a second spring being disposed between the second retainer element and a third retainer element, a least one of the first, the second and the third retainer elements having a seat or recess therein defining a sufficiently deep seat or recess for accommodating the spring and preventing coil binding from occurring when any one of the first, the second and the third retainer elements abut against a neighboring retainer element, and the springs and the retainer elements being selected so a first one of the springs is fully compressed before another of the plurality of springs is fully compressed.

Lastly, the present invention relates to an apparatus for generating a non-linear spring force, said apparatus comprising a base, a carriage supported by the base by at least one guide rod so that the carriage is linearly movable with respect to the base under application of an applied force, a spring arrangement for resisting the applied force, and the spring arrangement having a variable effective spring rate and comprising: at least first and second springs arranged in sequentially in series and each concentrically surrounding the first guide rod, the first spring being disposed between first and second retainer elements, and the second spring being disposed between the second retainer element and a third retainer element, each of the first, the second and the third retainer elements having a recess formed therein for accommodating a portion of the spring, during compression, and preventing coil binding from occurring when either the first and the second retainer elements abut against one another or when the second and the third retainer elements abut against one another, and the first and the second springs and the retainer elements are selected so a first one of the first and the second springs is fully compressed before the other of the first and the second springs is fully compressed.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views.

In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
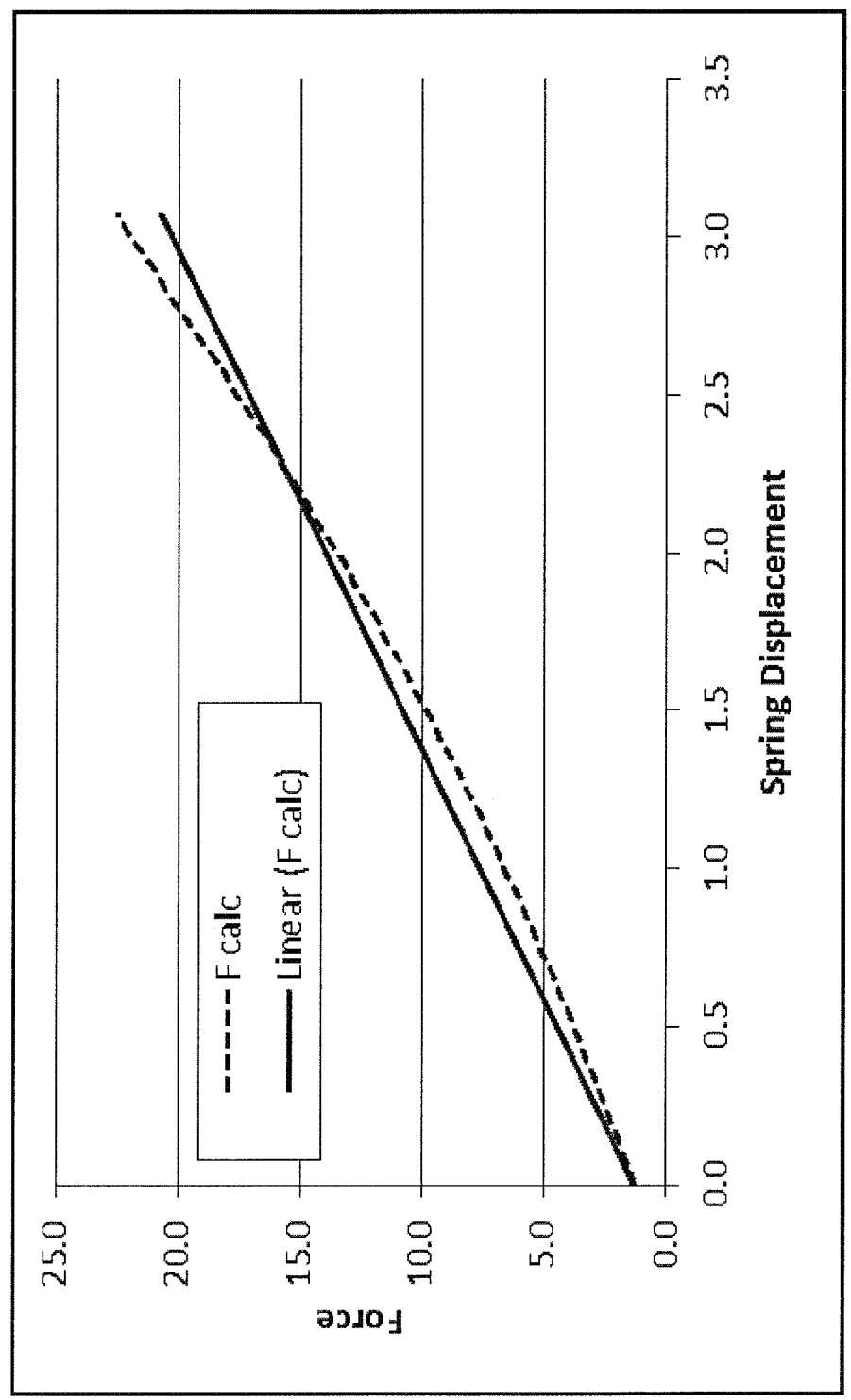
FIG. 1 is a graph of two functions, both plotted against the spring stroke and the amount of force exerted. The broken line shows the load profile that the apparatus is trying to simulate, based on collected data. The solid line is the linear approximation of the load profile that would be obtained if only a single spring were used to approximate the load profile.
Figure 2:
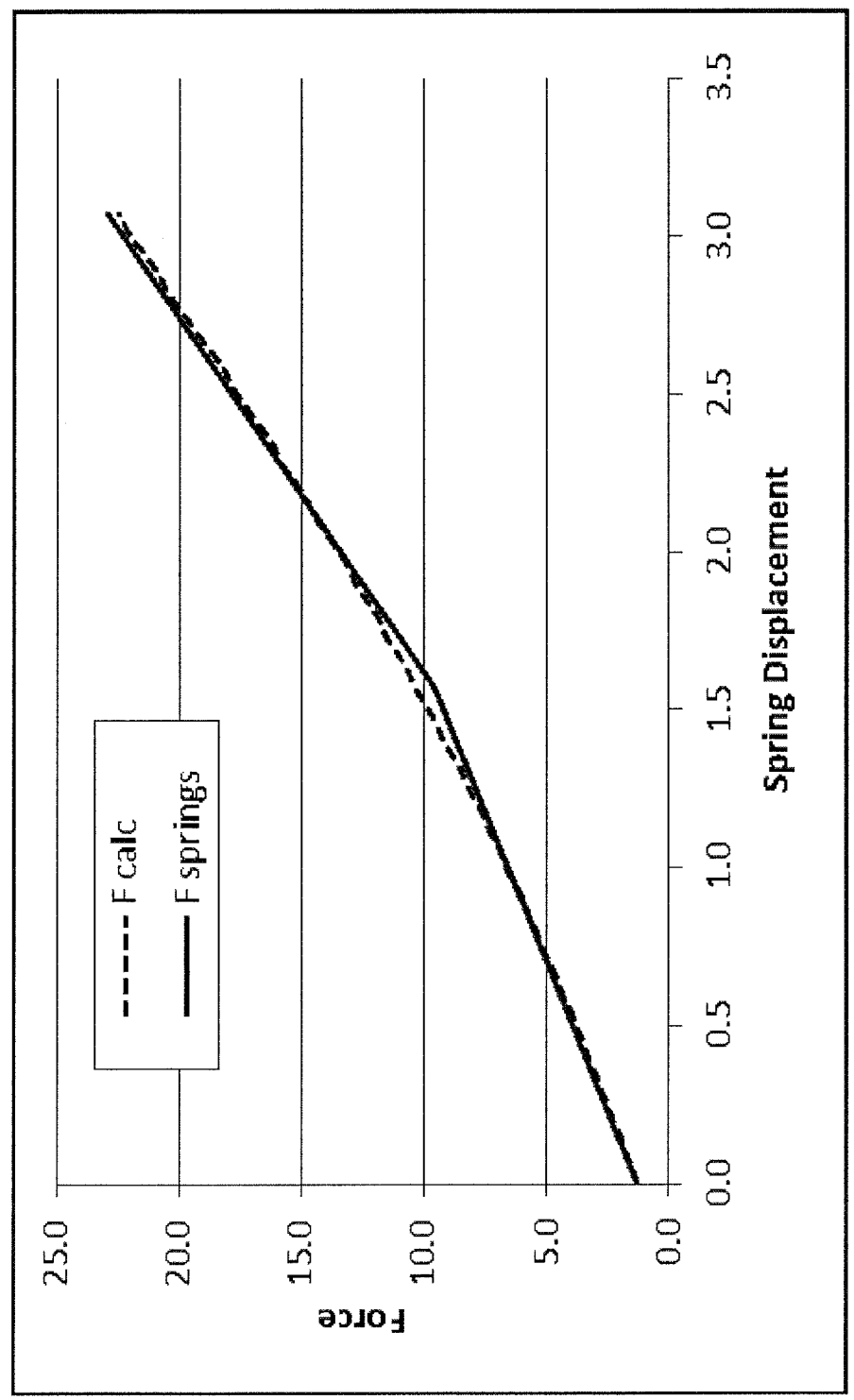
FIG. 2 is a graph showing the nonlinear function of the load profile and of the function of its estimation using a dual-spring system, according to the present invention. The broken line shows the actual load profile being simulated, whereas the solid line represents the load profile obtained by using two springs in series to approximate it, according to the present invention.
Figure 3:
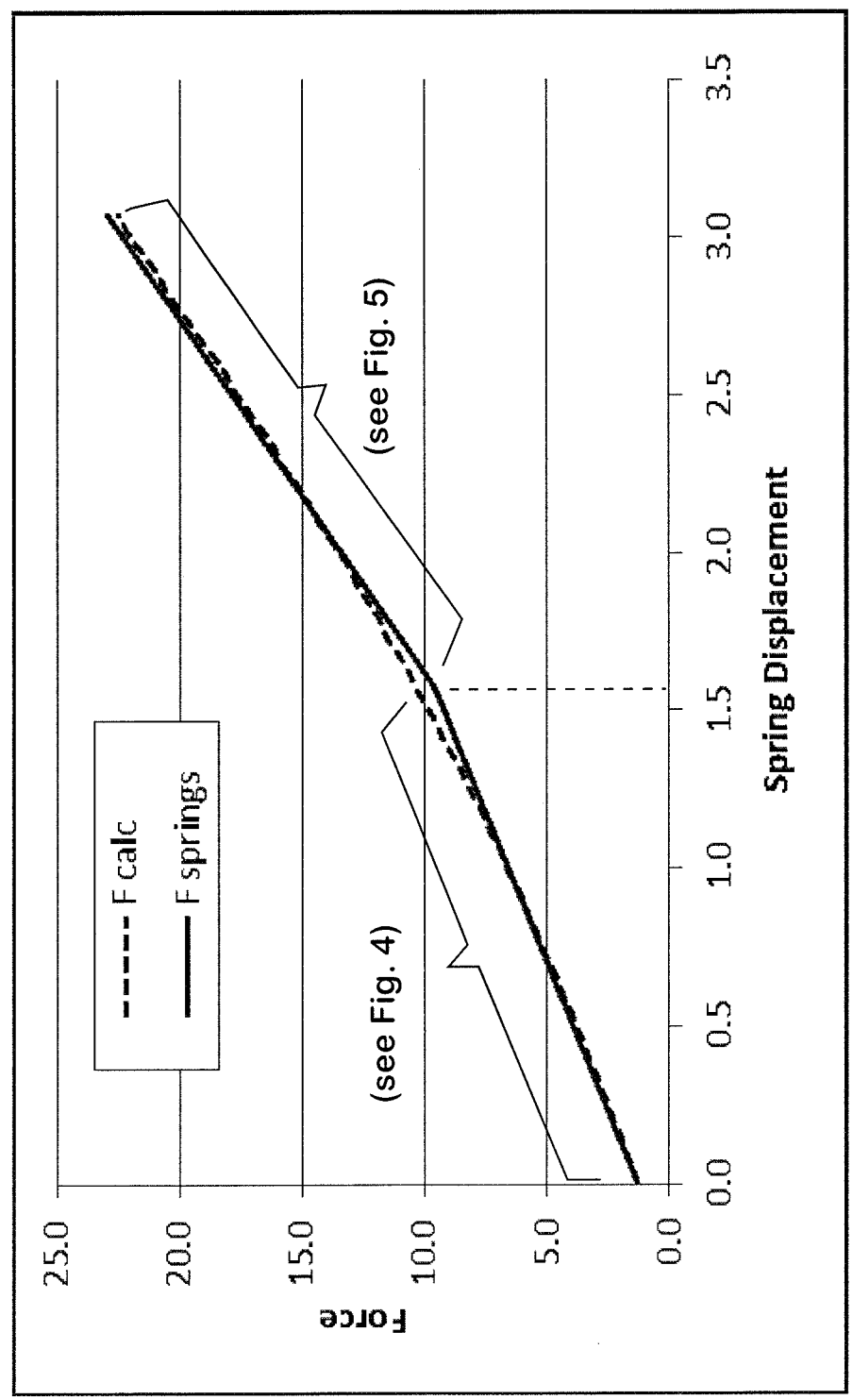
FIG. 3 is the same graph as in FIG. 2 but contains identifiers. The two regions of the graph are identified to show that the approximation graph using the present invention is a piecewise function. Additionally, the turning point of the graph is identified. This is the point at which one spring stops compressing, as shown in FIG. 5, and the system's net spring constant increases.
Figure 4:
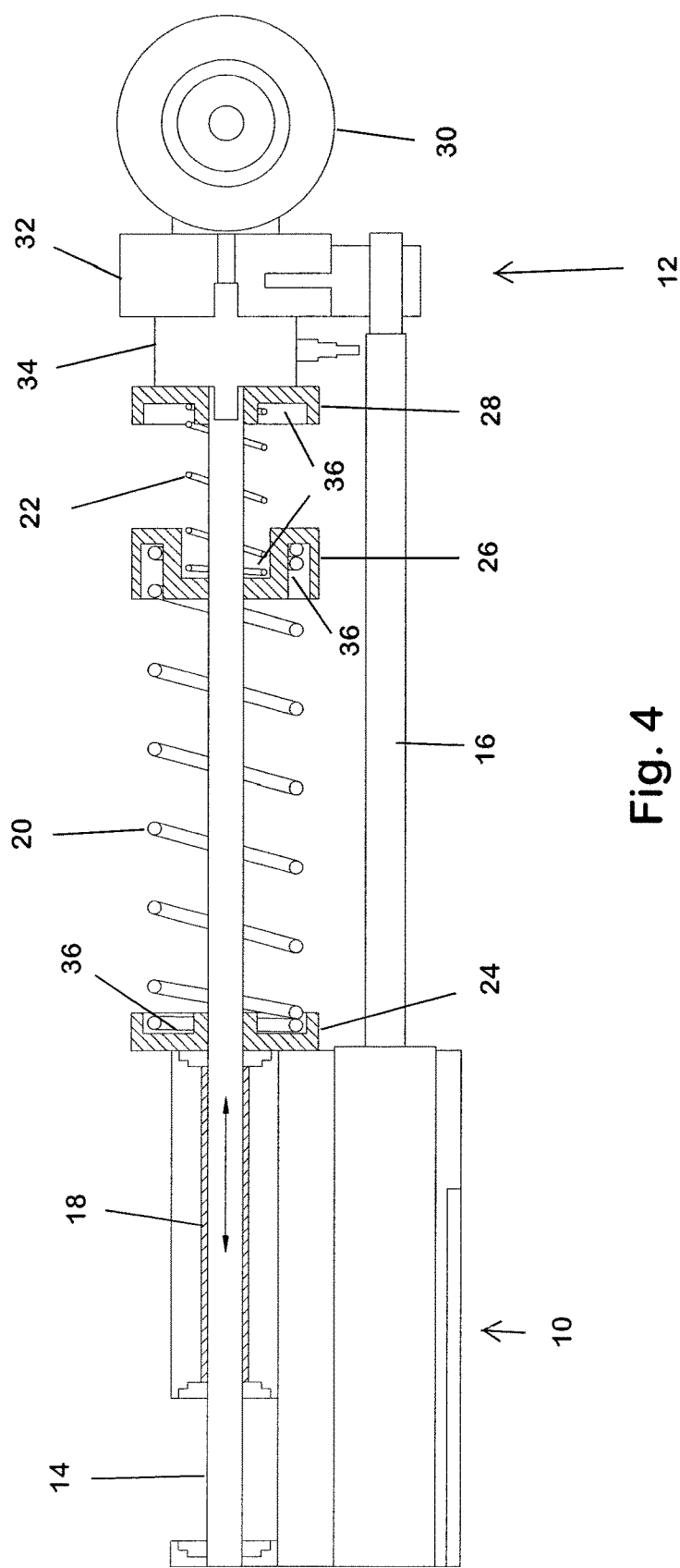
FIG. 4 is a simplified drawing of an apparatus embodying of the present invention. This figure shows the system from rest through the activity of both springs.
Figure 5:
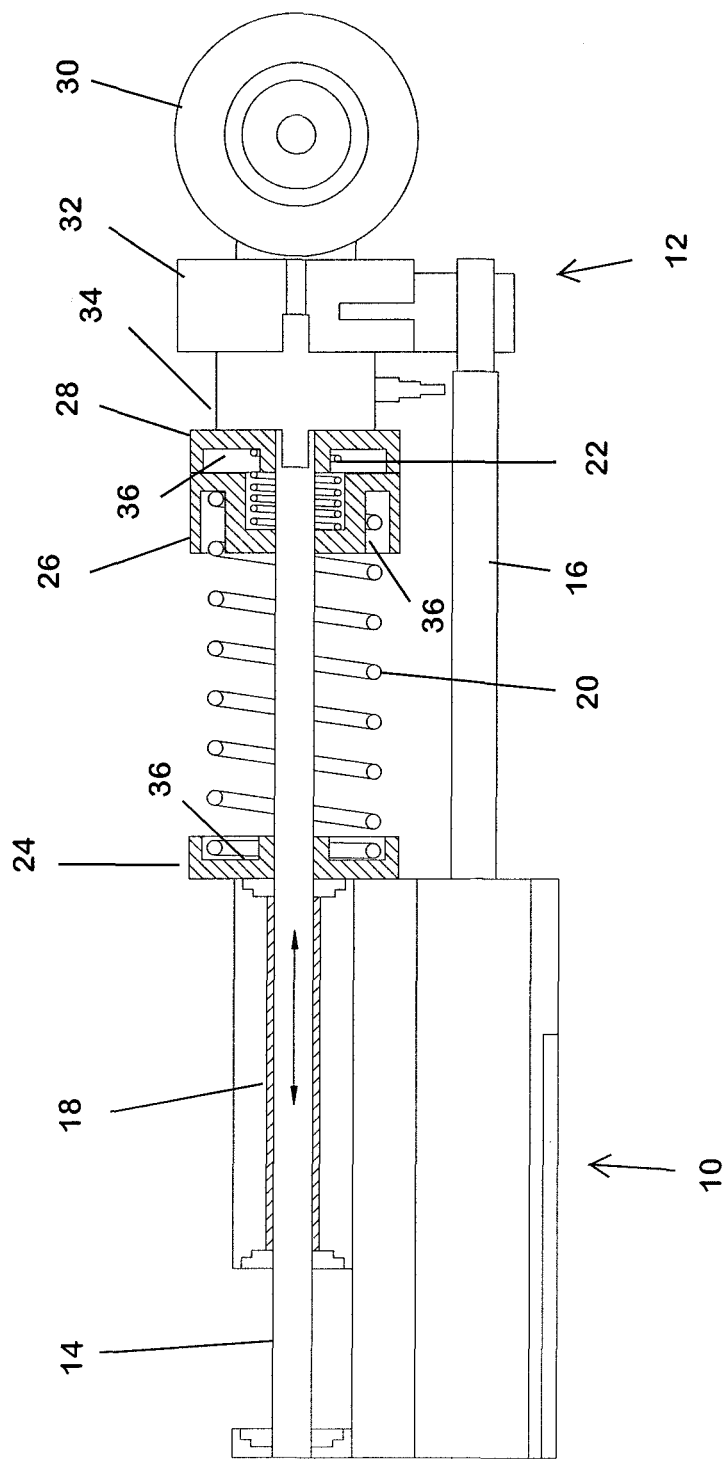
FIG. 5 is a view, similar to FIG. 4, showing one of the springs fully compressed.

An apparatus embodying the invention is shown in FIGS. 4 and 5. Turning now to those figures, a brief description concerning the various elements of the present invention will now be briefly discussed.

The apparatus includes a static base 10 and a linearly movable carriage 12 having upper and lower guide rods 14, 16 which pass through respective bushings or bearings 18 provided in the base. It is to be appreciated that the having two rods 14, 16 prevents the movable carriage 12 from turning about its longitudinal axis; however, the lower rod 16 may not be necessary for some applications and, therefore, should be regarded as optional. If used, the lower rod 16 may pass through or past a displacement transducer (not shown) located inside the base 10, which can provide information relating to relative position of the carriage.

First and second springs 20, 22, each having different compression characteristics and different free lengths, are disposed around and located concentric with the upper guide rod 14. The first spring 20 is located and retained between a first end retainer cup element 24 and an intermediate retainer element 26, while the second spring 22 is located and retained between a second end retainer cup element 28 and the intermediate retainer element 26. As a result of such arrangement, the first and the second springs 20 and 22 work in series.

The first, the intermediate and the second retainer cup elements 24, 26, 28 are each provided with a seat or recess 36 which accommodates an end portion of one of the first and the second springs 20 or 22. Preferably, the seats or recesses 36 are sufficiently deep that the associated springs 20 or 22 can compress without coil binding, up to the point where the associated elements come into contact with one another (see FIG. 5, for example). As shown in FIGS. 4 and 5, the seats recesses 36 formed in the intermediate retainer element 26 is deeper than the seats or recesses 36 formed in either of the first or the second retainer cup elements 24, 28. The depth of the respective seats or recesses 36, as well as the spring characteristics of the first and the second springs 20, 22 can be chosen so as the provide a good match to the design force curve.

FIG. 5 shows the point at which the intermediate and the second retainer cup elements 26 and 28 come into contact and abut one another. Note that the fully compressed second spring 22, nearer the applied force, is barred or prevented from any further compression due to the abutment between the intermediate and the second retainer cup elements 26 and 28. In addition, the second spring 22 is now totally encased by and within the mating seats recesses 36 of the intermediate and the second retainer cup elements 26 and 28. From this point onward, only first spring 20 is active and the effective spring constant is now greater than before.

The lower-sloped part of the graph is controlled by the present invention while both the first and the second springs 20, 22 are active; the higher-sloped part of the graph is controlled by the invention while only one spring, e.g., the first spring 20, is active.

Spring compression results from a force applied to the end of the carriage 12. This force may be generated by a machine component. The circle 30 diagrammatically represents a roller where the force is applied. The roller is attached, via a bracket, to the block 32. It is to be appreciated that this roller could be replaced by another type of interface, depending on the specific application, without departing from the spirit and scope of the present invention.

The block 32, located to the left of the circle 30, represents a connector that provides a connection between the spring assembly and the point of force application. A force transducer 34, which is an optional component, measures the amount of force applied to the spring assembly.

The springs and retainer cup elements are selected or designed so that one spring will continue to be compressed after the first spring is totally encased within the mating seats or recesses 36, as generally shown in FIG. 5. In the illustrated embodiment, the first spring 20, with the longer compression length, is fully compressed after the second spring 22 is fully compressed; however, It is to be appreciated that this order may be altered by appropriately altering spring selections.

Figure 6:
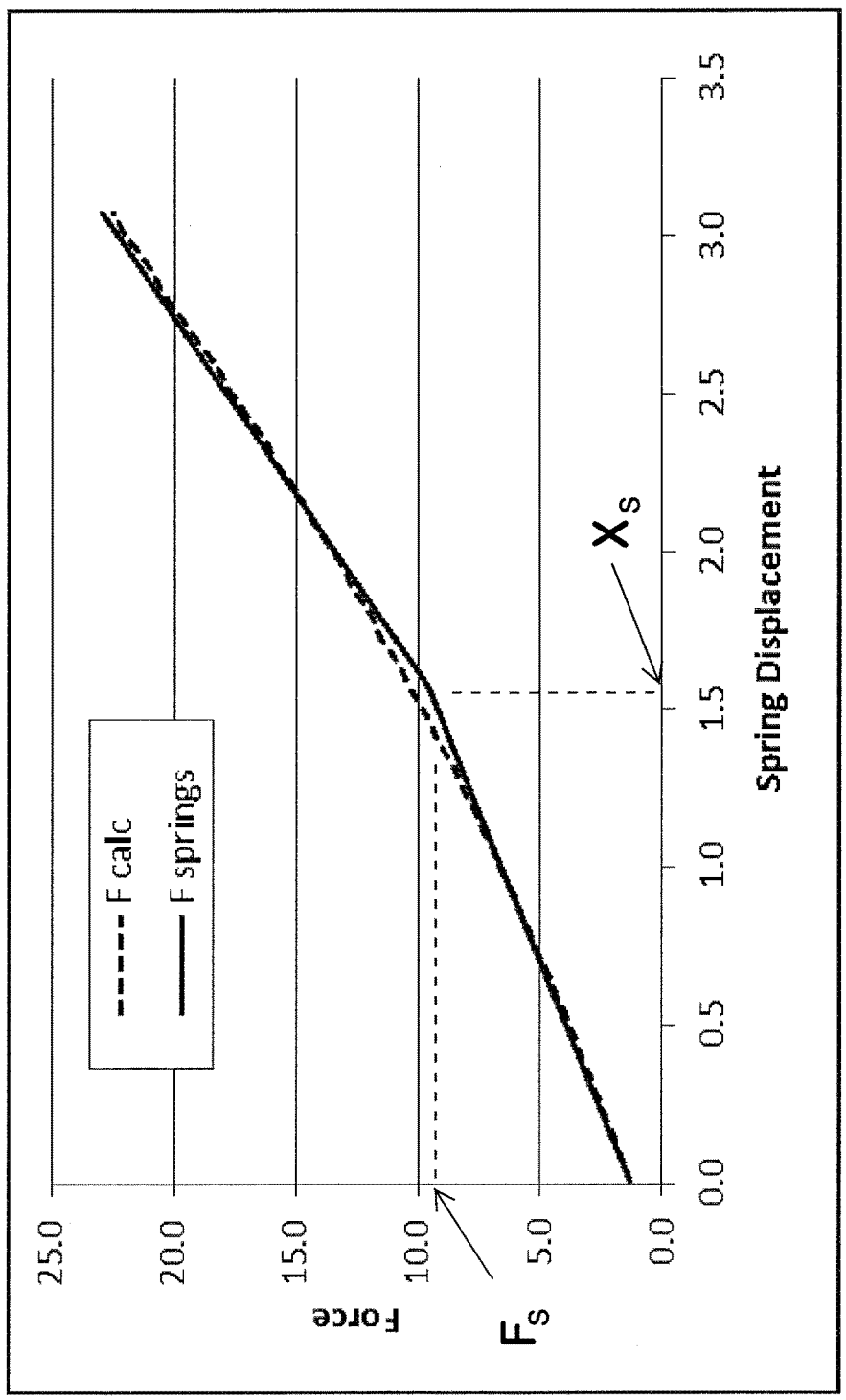
FIG. 6 is a view, similar to FIG. 3, showing parameters for selecting the springs for use.

FIG. 6 shows the effective spring constant of the springs in series, exhibited in the boxed portion of the graph to the lower left, and the spring constant of only one of the springs, exhibited by the unboxed portion of the graph. The individual spring constants are selected based on design goals, considering the following relationships:

For two springs, e.g., first and second springs 20, 22, arranged in series, the effective spring rate is equal to:

$$k_{eff} = k_1 \cdot k_2 / (k_1 + k_2).$$

Assuming the first spring 1 stops deflecting first at a deflection equal to $X_s$, the force generated at any deflection between x=0 and x=$X_s$ is given by:

$$F = k_{eff} \cdot x.$$

The force generated at any deflection x over Xs is equal to:

$$F = F_s + k2 \cdot (x - X_s).$$

The value of $X_s$ is dependent on the design goals and is a chosen value.

The spring rates $k_1$ and $k_2$ are chosen to best match the curve for a $F_s$ given the value of $X_s$.

It should be understood that the above description is only exemplary, and that the parts described above need not be made of any specific materials. It may also be noticed that in the illustrated embodiment, the small second spring 22 is enclosed first and the large first spring next; however, the arrangement may be altered to suit the force being simulated. Furthermore, the left-right placement of the larger and smaller springs may be swapped, without departing from the spirit and scope of the present invention. Additionally, while the two springs, arranged in series, are described above, more than two springs might be used, in which case an additional intermediate retainer element (s) would be necessary.

Inasmuch as the invention is subject to modifications and variations, it is intended that this invention should be measured by the claims presented herein.

While various embodiments of the present invention have been described in detail, it is apparent that various modifications and alterations of those embodiments will occur to and be readily apparent to those skilled in the art. However, it is to be expressly understood that such modifications and alterations are within the fully scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

What is claimed is:

1. An apparatus for generating a non-linear spring force, said apparatus comprising
   a stationary base,
   a linearly movable carriage supported by the stationary base so as to be movable with respect to the base under application of an applied force,
   wherein the linearly movable carriage is supported by a first guide rod and a second guide rod which extends parallel to and spaced apart from the first guide rod, and
   a spring arrangement concentrically supported by the first guide rod, and configured to resisting the applied force, the spring arrangement having a variable effective spring rate and comprising:
      a plurality of springs arranged in series, including a first spring disposed between first and second retainer elements, and a second spring being disposed between the second retainer element and a third retainer element,
      at least one of the first, the second, and the third retainer elements having a recess therein defining a sufficiently deep recess for accommodating the spring and preventing coil binding from occurring when any one of the first, the second, and the third retainer elements abut against a neighboring retainer element, and
      the springs and the retainer elements being selected so a first one of the springs is fully compressed before another of the plurality of springs is fully compressed.

2. The apparatus of claim 1, wherein the carriage is supported by the base via the first guide rod, and the first guide rod concentrically supports the first, the second, and the third retainer elements.

3. The apparatus of claim 1, wherein said springs have different spring rates.

4. The apparatus of claim 1, wherein said springs have different free lengths.

5. An apparatus for generating a non-linear spring force, said apparatus comprising
   a static base, and
   a linearly moveable carriage supported by the base by a first guide rod so that the carriage is movable with respect to the base under application of an applied force,
   wherein the carriage is supported by a second guide rod which extends parallel to and spaced apart from the first guide rod,
   the first guide rod concentrically supporting a spring arrangement for resisting the applied force, and the spring arrangement having a variable effective spring rate and comprising:
      at least first and second springs arranged in series, the first spring being disposed between first and second retainer elements, and the second spring being disposed between the second retainer element and a third retainer element,
      each of the first, the second and the third retainer elements being concentrically supported by the first guide rod and having a recess formed therein for accommodating a portion of the spring, during compression, and preventing coil binding from occurring when either the first and the second retainer elements abut against one another or when the second and the third retainer elements abut against one another, and
      the first and the second springs and the retainer elements are selected so a first one of the first and the second springs is fully compressed before the other of the first and the second springs is fully compressed.

6. The apparatus of claim 5, wherein the first and the second springs have different spring rates and different free lengths.

7. The method of claim 6, wherein the apparatus further comprises a force transducer which is connected with the carriage for measuring an amount of force applied to the apparatus.

* * * * *